United States Patent
Wakchaure

(10) Patent No.: US 9,816,893 B2
(45) Date of Patent: Nov. 14, 2017

(54) DEVICE FOR DETECTING FLUID LEAKAGE

(75) Inventor: Vijaykumar K. Wakchaure, Pune (IN)

(73) Assignee: CTR MANUFACTURING INDUSTRIES LIMITED, Pune (IN)

( * ) Notice: Subject to any disclaimer, the term of this patent is extended or adjusted under 35 U.S.C. 154(b) by 238 days.

(21) Appl. No.: 14/398,158

(22) PCT Filed: May 1, 2012

(86) PCT No.: PCT/IB2012/052168
§ 371 (c)(1),
(2), (4) Date: Oct. 31, 2014

(87) PCT Pub. No.: WO2013/164662
PCT Pub. Date: Nov. 7, 2013

(65) Prior Publication Data
US 2015/0082870 A1    Mar. 26, 2015

(51) Int. Cl.
| | |
|---|---|
| *G01M 3/02* | (2006.01) |
| *G01M 3/04* | (2006.01) |
| *G01M 3/28* | (2006.01) |
| *G01M 3/32* | (2006.01) |

(52) U.S. Cl.
CPC ............. *G01M 3/04* (2013.01); *G01M 3/02* (2013.01); *G01M 3/2807* (2013.01); *G01M 3/2876* (2013.01); *G01M 3/3245* (2013.01)

(58) Field of Classification Search
CPC ........ G01M 3/02; G01M 3/04; G01M 3/2807; G01M 3/2861; G01M 3/2876; G01M 3/3245; F17D 5/02; E21B 47/10; E21B 33/03; E21B 33/08; E21B 43/00
See application file for complete search history.

(56) References Cited

U.S. PATENT DOCUMENTS

| | | | | |
|---|---|---|---|---|
| 688,304 | A * | 12/1901 | Grinnell | A62C 35/605 169/23 |
| 1,558,623 | A * | 10/1925 | Park | A62C 35/605 169/23 |
| 3,152,572 | A * | 10/1964 | Allhoff, Jr. | G01M 3/2807 116/228 |
| 3,439,897 | A * | 4/1969 | Priese | F16K 5/202 251/170 |
| 4,466,273 | A | 8/1984 | Pillette | |
| 4,573,344 | A * | 3/1986 | Ezekoye | F16K 41/00 73/40.5 R |
| 5,148,699 | A | 9/1992 | Morse | |
| 5,511,573 | A * | 4/1996 | Corte | F16K 27/12 137/15.08 |
| 6,578,602 | B1 * | 6/2003 | Kirschner | A62C 35/68 137/312 |

(Continued)

*Primary Examiner* — Randy Gibson
*Assistant Examiner* — Gedeon M Kidanu
(74) *Attorney, Agent, or Firm* — Hamre, Schumann, Mueller & Larson, P.C.

(57) ABSTRACT

The subject matter disclosed herein relates to fluid leakage detection. More particularly, subject matter relates to a device for detecting fluid leakage in a fluid drain pipe attached to a power transformer device. The device comprises fluid collection compartment attached to bottom of the fluid drain pipe and a fluid level switch is positioned in the fluid collection compartment to generate alarm signal to indicate fluid leakage.

9 Claims, 3 Drawing Sheets

(56) References Cited

U.S. PATENT DOCUMENTS

| | | | | |
|---|---|---|---|---|
| 7,561,057 B2 * | 7/2009 | Kates | .................... | G01M 3/002 |
| | | | | 340/605 |
| 2003/0066293 A1 * | 4/2003 | Wilcox | ................. | F01M 11/04 |
| | | | | 60/772 |
| 2005/0199546 A1 * | 9/2005 | Rusta-Sallehy | ... | H01M 8/04164 |
| | | | | 210/512.1 |
| 2007/0001793 A1 * | 1/2007 | Magnier | ............... | H01F 27/402 |
| | | | | 336/90 |
| 2007/0074759 A1 * | 4/2007 | McClung | ................ | F16K 17/34 |
| | | | | 137/68.14 |
| 2010/0193037 A1 * | 8/2010 | Lidman | ................... | A01J 7/022 |
| | | | | 137/14 |
| 2012/0200961 A1 * | 8/2012 | Magnier | ............... | H01F 27/402 |
| | | | | 361/37 |

* cited by examiner

DEVICE FOR DETECTING FLUID LEAKAGE

TECHNICAL FIELD

The subject matter disclosed herein relates to fluid leakage detection. More particularly, subject matter relates to a device for detecting fluid leakage in a fluid drain pipe attached to a power transformer device.

BACKGROUND

In the process control industry, automated control valves are used extensively to control process fluid mass flow and/or velocity in industrial processes. In some instances, especially in batch processes, it is necessary that a valve achieve a tight shut-off condition when it is closed. The phrase "tight shut-off" refers to a valve position wherein zero or near-zero fluid flows through the valve. In particular, a tight shut-off condition exists where no fluid flows through the valve, or where fluid flow is reduced to such a level that the flowing fluid had negligible impact.

In industrial process where a tight valve shut-off condition is required, if the valve does not shut-off tightly, the resulting material leakage into a batch recipe can ruin the batch. If a tight shut-off valve is leaking a noxious or toxic chemical, the leak can present a hazard for plant personnel. Also in industrial process, where a leak proof condition required in normal working conditions where rupture disc is used, and due to partial rupturing resulting oil/fluid leakage.

Further, leaks threaten the environment, people, equipment and business. They are inevitable in today's technically complex environments. It's something everyone has to contend with and plan for. They can be disastrous if not discovered quickly. They may do a lot of damage and be difficult to clean up, even dangerous. However, if detected quickly, a timely warning could be server to indicate that a critical equipment is starting to fail. Fast action at an early stage can avert damage and interruption of service.

In existing approach fluid leak detection is carried out using temperature level sensor and pressure level sensors. These sensors are included in the chambers/tank where fluid is collected. These types of approach help in detecting leakage of the fluid through the tank. However, such type of approach cannot be used to detect fluid leakage happening though a closed valve disposed between an upstream pipe and a downstream pipe of industrial process.

There is an on-going need in the process control industry for a means of detecting when a tight shut-off valve is leaking. Embodiments of the present disclosure provide solutions to these and other problems, and offers advantages over the prior art.

SUMMARY OF THE DISCLOSURE

The shortcomings of the prior art are overcome and additional advantages are provided through the provision of a method and a system as described in the description.

The subject matter disclosed herein solves the limitations of existing arts by installing a device having fluid level switch below the fluid drain pipe for detecting fluid leakage occurring through closed valves.

The subject matter disclosed herein provides a foolproof device for detecting fluid leakage.

The system disclosed in the present subject matter is devoid of pressure sensors, temperature sensors or vapor sensors means and is economical. Further the system disclosed herein includes minimal intricacies involved during operation.

Additional features and advantages are realized through various techniques provided in the present disclosure. Other embodiments and aspects of the disclosure are described in detail herein and are considered as part of the claimed disclosure.

In one non-limiting exemplary aspect, a device for detecting fluid leakage though a closed valve disposed in a fluid drain pipe is disclosed. The device comprises fluid collection compartment attached to bottom of the fluid drain pipe for collecting fluid leaked through a closed fluid drain valve. The fluid collection compartment comprises at least one through hole each at top and bottom part, whose cross sectional area is same as that of the fluid drain pipe, wherein area surrounding the through hole of the bottom part of the fluid collection compartment is configured to collect the leaked fluid; and bottom part of the fluid collection chamber is connected with an fluid discharge pipe. The fluid discharge pipe extends till predetermined height into the fluid collection chamber through the through hole. The device also includes at least one fluid level switch positioned at a predetermined location inside the fluid collection compartment, the fluid level switch triggers an alarm upon collection of predetermined amount of fluid in the compartment to indicate fluid leakage.

The foregoing summary is illustrative only and is not intended to be in any way limiting. In addition to the illustrative aspects and features described above, further aspects, and features will become apparent by reference to the drawings and the following detailed description.

BRIEF DESCRIPTION OF ACCOMPANYING DRAWING

The novel features and characteristic of the disclosure are set forth in the appended claims. The embodiments of the disclosure itself, however, as well as a preferred mode of use, further objectives and advantages thereof, will best be understood by reference to the following detailed description of an illustrative embodiment when read in conjunction with the accompanying drawings. One or more embodiments are now described, by way of example only, with reference to the accompanying drawings wherein like reference numerals represent like elements and in which:

The figures depict embodiments of the disclosure for purposes of illustration only. One skilled in the art will readily recognize from the following description that alternative embodiments of the structures and methods illustrated herein may be employed without departing from the principles of the disclosure described herein.

DETAILED DESCRIPTION

The foregoing has broadly outlined the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific aspect disclosed may be readily utilized as a basis for modifying or designing other structures for carrying out the same purposes of the present disclosure. It should also be realized by those skilled in the art that such equivalent constructions do not depart from the spirit and scope of the disclosure as set forth in the appended claims. The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

Figure 1:
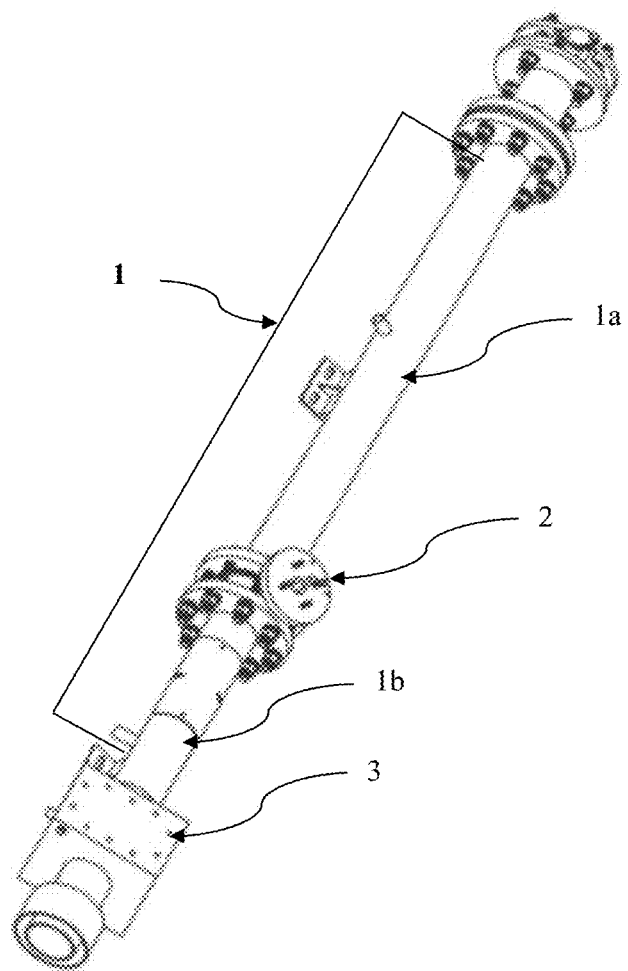
FIG. 1 illustrates an exemplary arrangement of a device used to detect fluid leakage in a fluid drain pipe of an industrial process.

FIG. 1 is an exemplary arrangement which shows integration of fluid leakage detection device with fluid drain pipe (1). At least one fluid drain valve or rupture disc (2) is disposed in the fluid drain pipe (1). It is evident from the figure that the fluid leakage detection device is integrated at bottom of the fluid drain pipe (1). Fluid drain pipe (1) divided into two different parts as an upper fluid drain pipe (1a) and a lower fluid drain pipe (1b). The upper fluid drain pipe (1a) has one end connected to the fluid storage tank. Other end of the upper fluid drain pipe is connected to receiving end/inlet port of fluid drain valve or rupture disc (2). The lower fluid drain pipe (1b) has one end connected to the outlet port of the fluid drain valve or rupture disc (2). Other end of the lower fluid drain pipe is (1b) connected to the top side portion of the fluid collection compartment (3). The fluid drain valve or rupture disc (2) is disposed between the upper fluid drain pipe (1a) and lower fluid drain pipe (1b). The upper fluid drain pipe (1a) and the lower fluid drain pipe (1b) are connected the drain valve or rupture disc (2) using fasteners (11). The fastener (11) includes but are not limiting to nut and bolts, rivets. During normal industrial process, the fluid drain valve or rupture disc (2) is opened to drain out the fluid collected in the tank though fluid drain pipe (1). However, there exist circumstances where fluid tends to leak out through a closed fluid drain valves or rupture disc (2). This fluid leak is not desirable act when the drain valves (2) are closed. The leak would causes loss to industrial resources and creates damages to industrial equipments.

Figure 2A:
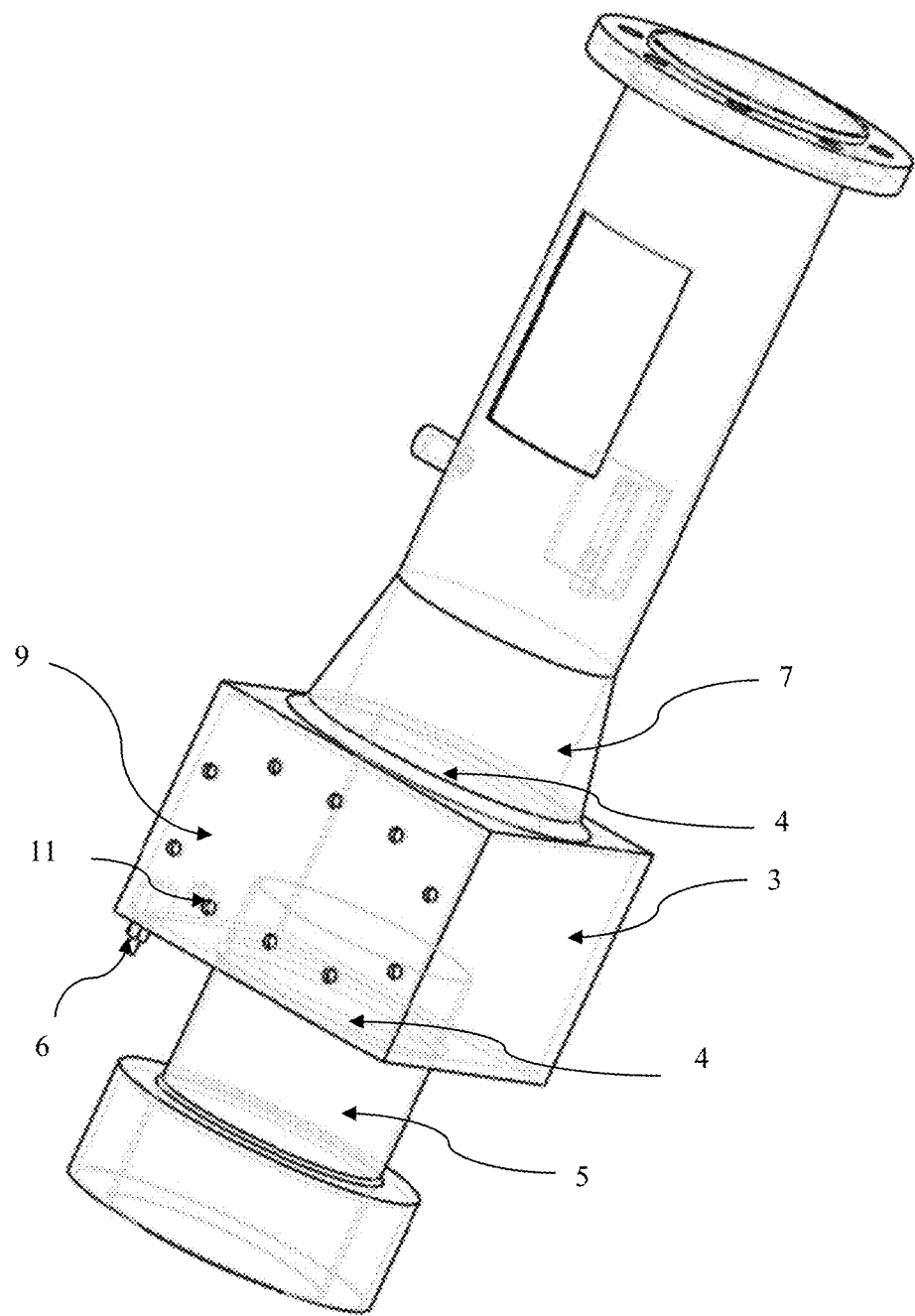
FIGS. 2a and 2b shows an exemplary diagram of a device used to detect fluid leakage through a closed valve.
Figure 2B:
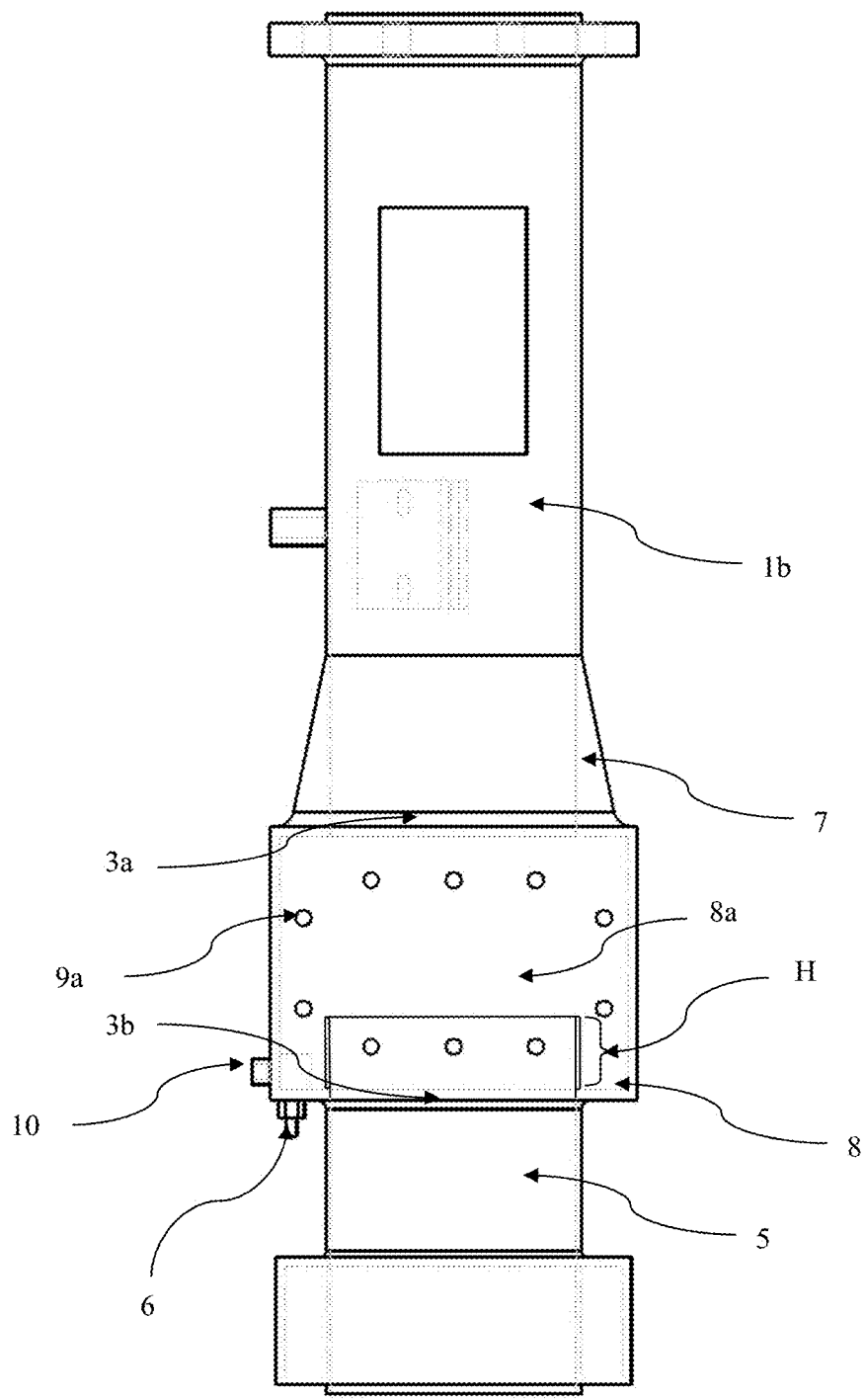

FIGS. 2a and 2b show detailed view of fluid collection compartment (3). The fluid collection compartment (3) is attached at bottom of the oil drain pipe (1) to collect the leaked fluid when the drain valve or rupture disc (2) is closed. Shape of the fluid collection compartment (3) includes but is not limiting to square, rectangular, circular and any other shape which serves the purpose. The fluid which is collected in the compartment (3) includes but is not limiting to combustion coolant oil, dielectric oil, diesel, petrol, and water. The fluid drain pipe (1) connecting the collection compartment (3) has an extended diverging portion (7). The extended diverging portion (7) of the fluid drain pipe (1) is connected to the fluid collection compartment (3) using at least one of welding, brazing and cold forging. However, any other techniques can be used to connect the fluid drain pipe (1) to the fluid collection compartment (3). The compartment (3) has at least one through hole (4) or passageway each at bottom and top side of the compartment (3). The through hole (4) on top side (3a) of the compartment is connected to the diverging portion (7) and the through hole (4) at the bottom side (3b) of the compartment (3) is connected to a fluid discharge pipe (5). The center axis of the fluid drain pipe (1) and the through holes (4) at bottom and top side (3b and 3a) of the compartment (3) are same. This is because whenever fluid drain takes place, the pressurized fluid should flow out directly through the through holes (4) to oil collection pit without spilling out in the fluid collection compartment (3). However, there may be chances that fluid may enter into the fluid collection compartment (3) because of extended diverging portion (7) provided at bottom of the fluid drain pipe (1). In that case necessary mechanism has to be included to drain out the fluid collected in the fluid collection compartment (3).

Further, the fluid collection compartment (3) is provided with fluid collection area (8). This area is provided at bottom of the fluid collection compartment (3). The fluid collection area (8) is an area surrounding the through hole (4) at the bottom side of the fluid collection compartment (3). This area is used to collect the leaked fluid from the fluid drain valve or rupture disc (2). It has been observed that there are possibilities of fluid leakage though the closed fluid drain valve or rupture disc (2). Since the leaked fluid has relatively negligent pressure, it flows on side walls of the fluid drain pipe (1). As the leaked fluid reaches bottom side of the fluid drain pipe (1), instead of dripping directly out of the fluid collection compartment (3) through the through hole (4), it continues to flows on side wall of the extended diverging portion (7) of the fluid drain pipe (1). This would cause the leaked oil to be collected at fluid collection area (8) of the fluid collection compartment (3). A fluid discharge pipe (5) is connected to the bottom part of the fluid collection compartment (3). In one exemplary embodiment, the fluid discharge pipe (5) extends till predetermined height (H) into the fluid collection compartment (3) through the through hole (4). This cause the collected leaked fluid to remain in the fluid collection area (8) as the extended part of the oil discharge pipe acts as a sidewall to guard against escape of collected leaked fluid though the through hole (4) on the bottom side of the collection compartment (3). However, it is clear that one skilled in art can come-up with various means of holding the leaked fluid in the collection area (8).

The fluid collection compartment (3) further provided with at least one fluid level switch (6). The fluid level switch (6) is positioned at predetermined location of the fluid collection compartment (3). In the present disclosure, the fluid level switch (6) is positioned at one of the corners of bottom portion of the fluid collection compartment (3). A required arrangement is made at the fluid collection compartment (3) to fix the fluid level switch (6) in the compartment (3). Further, a cutout (8a) of predetermined size and shape is made at one of the side faces of the fluid collection compartment (3). Shape of the cutout (8a) can be varied which includes but are not limiting to square, rectangular, circle, oval, and any other shape which serves the purpose. Size of the cutout (8a) should be such that it should allow reaching the operator's or maintenance person's hand till the fluid level switch (6) easily, without any difficulties. Also, it should provide a provision to peep into the compartment (3). Further, predetermined numbers of locking holes (9a) are made surrounding the cutout (8a) portion. A locking plate (9) having same numbers of locking holes (9a) are attached to the fluid collection compartment (3) in order to conceal the cutout (8a). This is because while draining the fluid through the fluid drain pipe (1), the fluid should not spill out though the cutout (8a). Thus, in order to avoid spilling out of the fluid and loss of the fluid, the locking plate (9) is provided. The number of locking holes (9a) varies from 2 to 10.

As explained in the background there are chances that fluid may leak through the closed fluid drain valve or rupture disc (2). The leaked fluid is collected in the fluid collection compartment (3). The fluid level switch (6) senses the presence of the fluid in the fluid collection compartment (3). Based on the amount of leaked fluid, the fluid level switch (6) would causes the float ball of fluid level switch (6) to rise or fall with the liquid level. The magnetic force of magnet which is inside the float ball will cause a reed switch to operate. When the float ball moves away from the reed switch, the reed switch will be turned OFF and if the float ball moves close to the reed switch, the reed switch is turned ON. Upon collection of predetermined amount of leaked fluid in the fluid collection area (8), the fluid level switch would turn ON the reed switch. Once the reed switch is turned ON, it triggers an alarm to indicate possible leakage through closed fluid drain valve or rupture disc (2). The type of the alarm includes but is not limiting to visual, audio and combinations thereof. Any type of the alarm can be configured in the system which serves the purpose of alerting or signalling an operator.

In addition to above, fluid drain plug (10) is provided in the fluid collection compartment (3) to drain out the fluid collected in the fluid collection area (8). The collection of fluid in the fluid collection area (8) could either be during the operation of fluid draining or leaked fluid. A mechanism can be provided to switch OFF the alarm used to indicate fluid leakage whenever fluid drain valve or rupture disc (2) is opened for draining the fluid.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

List of Reference Numerals

| Reference Numeral | Description |
|---|---|
| 1 | Fluid Drain Pipe |
| 1a | Upper Fluid Drain Pipe |
| 1b | Lower Fluid Drain Pipe |
| 2 | Fluid Drain Valve/Rupture Disc |
| 3 | Fluid Collection Compartment |
| 3a | Top side of the fluid collection compartment |
| 3b | Bottom side of the fluid collection compartment |
| 4 | Through hole |
| 5 | Fluid Discharge Pipe |
| 6 | Fluid Level Switch |

List of Reference Numerals

| Reference Numeral | Description |
|---|---|
| 7 | Extended Diverging Portion |
| 8 | Fluid collection area |
| 8a | Cutout |
| 9 | Locking Plate |
| 9a | Locking holes |
| 10 | Drain Plug |
| 11 | Fasteners |
| H | Pre-determined height |

The invention claimed is:

1. A device that detects leakage of fluid when a fluid drain valve or rupture disc disposed in a fluid drain pipe is closed, the device comprising:
    a fluid collection compartment attached to a bottom end of the fluid drain pipe that collects leaked fluid when the fluid drain valve or rupture disc is closed, the fluid collection compartment comprises:
        at least one through hole each at a top side and a bottom side of the fluid collection compartment, wherein the at least one through hole at the top side of the fluid collection compartment is connected to the bottom of the fluid drain pipe which has an extended diverging portion to channelize the leaked fluid into the fluid collection compartment; and
        the bottom side of the fluid collection compartment is connected with a fluid discharge pipe that extends a predetermined height into the fluid collection compartment through the at least one through hole provided at the bottom side of the fluid collection compartment, wherein an area in the fluid collection compartment surrounding the fluid discharge pipe is configured as a fluid collection area to collect the leaked fluid when the fluid drain valve or rupture disc is closed;
    at least one fluid level switch positioned at a predetermined location inside the fluid collection compartment to trigger an alarm upon collection of predetermined amount of the leaked fluid in the fluid collection area to indicate leakage of the fluid.

2. The device as claimed in claim 1, wherein the fluid collection compartment is provided with at least one drain plug that permits draining of the leaked fluid collected in the fluid collection area of the fluid collection compartment.

3. The device as claimed in claim 1, wherein the alarm is selected from at least one of an audio alarm and a visual alarm.

4. The device as claimed in claim 1, wherein the fluid drain valve or rupture disc is disposed outside of the fluid collection compartment.

5. A transformer explosion controlling system comprising the device as claimed in claim 1.

6. A transformer comprising the transformer explosion controlling system as claimed in claim 5 that detects leakage of fluid when the fluid drain valve or rupture disc disposed in the fluid drain pipe is closed.

7. The device as claimed in claim 1, wherein a cutout is made on at least one side face of the fluid collection compartment.

8. The device as claimed in claim 7, further comprising a predetermined number of locking holes provided on a surrounding part of the cutout.

9. The device as claimed in claim 8 further comprising at least one locking plate having a predetermined number of locking holes attached to a cutout side of the fluid collection compartment using fasteners with the help of locking holes provided on both the locking plate and the surrounding part of the cutout.

\* \* \* \* \*